US006465948B1

(12) United States Patent
Ghosh et al.

(10) Patent No.: US 6,465,948 B1
(45) Date of Patent: Oct. 15, 2002

(54) CATHODE RAY TUBE FUNNEL ENVELOPE MATERIALS AND CONSTRUCTION

(75) Inventors: Asish Ghosh, Slingerlands, NY (US); Willaim David Russell, Lee; Terutoshi Horiuchi, Lenox, both of MA (US); Mark Hayes Kingsley, Tokyo (JP)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/405,190

(22) Filed: Sep. 24, 1999

(51) Int. Cl.$^7$ ............................ H01S 31/00; H01K 1/42

(52) U.S. Cl. ................. 313/480; 220/2.3 A; 313/477 R

(58) Field of Search ................................ 313/480, 479, 313/477 R; 501/127, 108; 148/437, 440; 420/528; 220/2.1 A, 2.3 A, 2.1 R, 2.3 R

(56) References Cited

U.S. PATENT DOCUMENTS

| | | | | |
|---|---|---|---|---|
| 2,116,671 A | * | 5/1938 | Dowsett et al. | 250/27 |
| 2,877,139 A | | 3/1959 | Hyde | 428/428 |
| 3,284,658 A | * | 11/1966 | Winfield | 315/21 |
| D245,342 S | * | 8/1977 | Takeuchi | D14/43 |
| 4,250,602 A | | 2/1981 | Wichmann | 445/36 |
| 4,432,464 A | | 2/1984 | Seats | 313/364 |
| 4,432,738 A | | 2/1984 | Van Roosmalen | 445/36 |
| 4,451,241 A | | 5/1984 | Taketoshi | 118/726 |
| 4,718,203 A | | 1/1988 | Schweitz | 269/217 |
| 4,792,722 A | * | 12/1988 | Francis | 313/477 R |
| 4,990,417 A | | 2/1991 | Inada | 313/364 |
| 5,096,862 A | * | 3/1992 | Mathers et al. | 501/98 |
| 5,104,686 A | | 4/1992 | Kraner | 427/68 |
| 5,179,319 A | | 1/1993 | Iwasaki | 313/431 |
| 2001/0001251 A1 | * | 5/2001 | Tachibe et al. | 359/819 |

FOREIGN PATENT DOCUMENTS

| | | |
|---|---|---|
| EP | 0 892 074 | 1/1999 |
| GB | 1 070 566 | 6/1967 |
| WO | WO 98/03686 | 1/1998 |

OTHER PUBLICATIONS

Plastics Technology, Apr. 1999, Is Metal Molding in Your Future?, Tim Creasy, pp. 64–66 and p. 68.

* cited by examiner

*Primary Examiner*—Nimeshkumar D. Patel
*Assistant Examiner*—Thelma Sheree Clove
(74) *Attorney, Agent, or Firm*—Robert P. Santandrea; Noreen C. Johnson

(57) ABSTRACT

A cathode ray tube comprises a display and a funnel envelope. The funnel envelope comprises a thixotropic material. The thixotropic material thixotropic material is selected from at least one of thixotropic magnesium, thixotropic magnesium alloys, thixotropic aluminum, thixotropic aluminum alloys, or mixtures thereof or combinations.

15 Claims, 1 Drawing Sheet

CATHODE RAY TUBE FUNNEL ENVELOPE MATERIALS AND CONSTRUCTION

BACKGROUND OF THE INVENTION

The invention relates to cathode ray tubes. In particular, the invention relates to materials, configurations, and construction for funnel-shaped envelopes of cathode ray tubes.

Cathode ray tubes are used in a variety of applications, such as but not limited to, displays, monitors, televisions, computer displays (also known as monitors), radar screens, and other such devices. Cathode ray tubes generally comprise a funnel-shaped envelope (hereinafter referred to as a "funnel envelope"), an electron gun portion, and a display panel. Electrons are generated in the electron gun portion, formed into an electron beam that is passed through the inside of the funnel envelope, and impinged onto the display panel. The display panel includes a screen that is often coated with a phosphor so that the electron beam causes the phosphors to fluoresce and emit light. Thus, images can be viewed on the display panel when the cathode ray tube is in use.

Initially, cathode ray tubes were formed with metallic funnel envelopes. The metal funnel envelopes were heavy, cumbersome, and made the resulting device using the cathode ray tube device heavy to transport. Further, the costs associated with metallic funnel envelopes are high, and accordingly the cost of the associated cathode ray tube is high. The costs increase with the size of the cathode ray tube, thus as demands for larger displays are increasing the costs of the cathode ray tubes will also increase.

Metallic funnel envelopes have been replaced with glass funnel envelopes. The use of glass funnel envelopes were desirable as glass provided the funnel envelope and the associated cathode ray tube with a useful combination of lower costs, and enhanced mechanical, electrical, physical, and optical properties. Glass funnel envelopes for cathode ray tubes can provide lighter-weight cathode ray tubes and associated devices using the glass cathode ray tube. This lower weight is desirable as the portability of devices using cathode ray tubes, such as, but not limited to, television, computers and laptop computers, is steadily increasing.

Computer systems now generate, and can output, large amounts of information. This increase of generated information has lead to a need for larger computer displays (also known as monitors) using cathode ray tubes to view the information. Larger cathode ray tube displays will increase the amount of glass used in the cathode ray tube funnel envelope, and a cathode ray tube weight increase follows. A larger cathode ray tube will need an increase in funnel envelope length, which may not be desirable due to spatial restraints, for example in laptop computers. Accordingly, the overall weight and length of the funnel envelope and cathode ray tube will increase, and this weight increase is not desirable, as portability of computing systems is still very desirable. Further, the television market is also following the trend toward larger display panels, which leads to heavier and deeper cathode ray tubes, each of which consumers would like to avoid.

Therefore, a need exists to reduce the weight of a cathode ray tube while maintaining or increasing its display size. Also, a need exists to provide a cathode ray tube funnel envelope with a lower weight and length.

SUMMARY OF THE INVENTION

The invention sets forth a cathode ray tube that comprises a funnel envelope. The funnel envelope comprises thixotropic magnesium.

The invention also sets forth a cathode ray tube that comprises a funnel envelope. The funnel envelope comprises thixotropic aluminum.

Further, the invention sets forth a cathode ray tube that comprises a funnel envelope. The funnel envelope comprises thixotropic materials.

The invention sets forth a cathode ray tube that comprises a funnel envelope. The funnel envelope comprises a thixotropic material selected from thixotropic magnesium, thixotropic magnesium alloys, thixotropic aluminum, thixotropic aluminum alloys, and mixtures thereof and combinations thereof.

These and other aspects, advantages and salient features of the invention will become apparent from the following detailed description, which, when taken in conjunction with the annexed drawings, where like parts are designated by like reference characters throughout the drawings, disclose embodiments of the invention.

DESCRIPTION OF THE INVENTION

Figure 1:
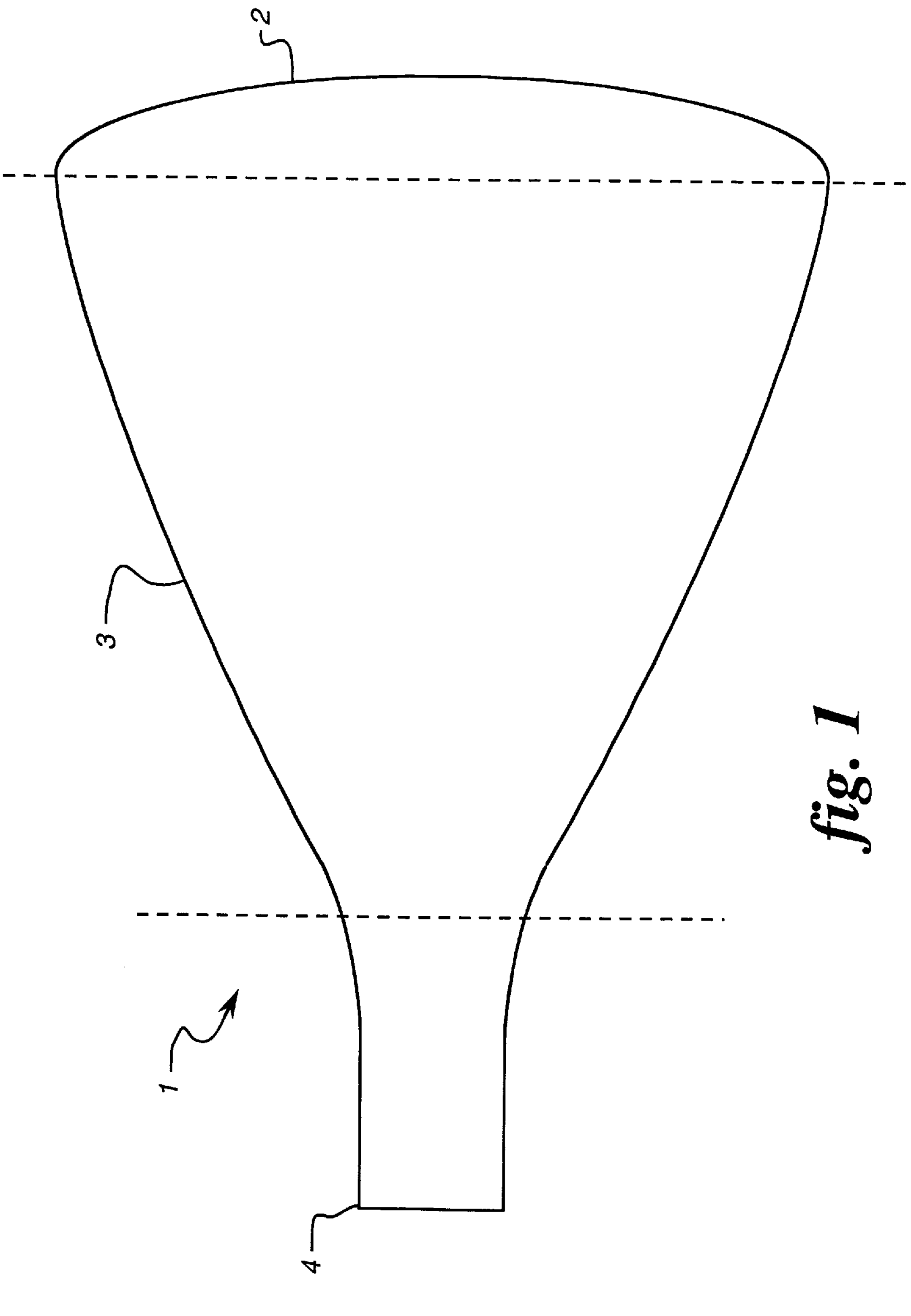
FIG. 1 is a schematic illustration of a cathode ray tube, as embodied by the invention.

A funnel envelope, as embodied by the invention, is formed of and comprises a thixotropic material. The thixotropic material can be selected from at least one of thixotropic magnesium, thixotropic magnesium alloys, thixotropic aluminum, thixotropic aluminum alloys, mixtures thereof, or combinations thereof (hereinafter referred to as "thixotropic materials"). A funnel envelope that is formed with thixotropic material, as embodied by the invention, will reduce the overall weight of conventionally formed glass funnel envelopes. Further, a funnel envelope that is formed with thixotropic material, as embodied by the invention, can result in the costs and overall length of a funnel envelope being reduced.

The thixotropic material, as embodied by the invention, is formed in accordance with known thixotropic material formation processes. The thixotropic material will have characteristics typical of thixotropic materials. For example, the thixotropic magnesium and the thixotropic aluminum, alloys, combinations and mixtures, which normally exhibit gel-like or colloidal (hereinafter referred to as colloidal) characteristics, will have a lower viscosity, such as a generally liquidus viscosity, when applied forces, including stresses, are applied to the material. Removal of the stresses will result in the thixotropic material returning to its colloidal characteristics.

In a thixotropic material formation process, as embodied by the invention, a thixotropic material, as embodied by the invention, in the form of powders or pellets is heated. The thixotropic material is heated to a temperature sufficient to provide the thixotropic material with a colloidal consistency. The term "colloidal consistency" means that the material has properties intermediate liquid and solid states. The thixotropic material may be heated to a temperature sufficient to form the thixotropic material prior to being disposed within a processor, for example, and in no way limiting of the invention, a press, extruder, or other similar processing apparatus. Alternatively, the thixotropic material may be heated within a processor to a temperature sufficient to form the colloidal state. The processor then forms the thixotropic material into a desired shape.

The processor applies adequate pressure to the thixotropic material so the thixotropic material flows relatively easily.

Further, the temperature that is applied to the thixotropic material in the processor may be in a range from about the thixotropic material's solidus temperature to about the thixotropic material's liquidus temperature. At temperatures in this range, the thixotropic material retains its colloidal characteristics, as described above. The flow rate and pressure applied to the thixotropic materials to form the funnel envelope will vary dependent on size, shape, and other structural characteristics of the cathode ray tube.

The thixotropic material, as embodied by the invention, provides desirable effects when used as a cathode ray tube funnel envelope. For example, and in no way limiting of the invention, the thixotropic material can be formed into thin-walled funnel envelope structures, which retain sufficient strength for cathode ray tube applications. The thixotropic material walls can be formed with a thickness of about 0.025 inches (about 0.6 millimeters (mm)), and can be formed with a thickness up to about 0.75 inches (about 20 mm). Glass materials are difficult to form in thickness as low as 0.025 inches.

Also, the thixotropic materials, as embodied by the invention, provide inherent shielding effects, such as EMI and RFI shielding, for the cathode ray tube due to the metal content of the thixotropic material used for the funnel envelope. The shielding is desirable to avoid extraneous outside electrical influences that could adversely influence operation of the cathode ray tube. The inherent shielding may make it possible to eliminate existing internal magnetic shielding, which is typically included in cathode ray tubes to avoid the undesirable influence of magnetic fields, both natural and artificially created. The inherent shielding of the funnel envelope, as embodied by the invention, may result in alternative manufacturing processes for devices incorporating cathode ray tubes with funnel envelope, as embodied by the invention. The alternative manufacturing process may result in a reduce of overall costs associated with manufacturing the cathode ray tube related device.

Further, the thixotropic materials in the funnel envelope also provide thermal protection for the cathode ray tube. The thermal protection is desirable to protect the cathode ray tube from elevated temperatures that can occur during cathode ray tube operation.

FIG. 1 is a schematic illustration of a cathode ray tube 1. The cathode ray tube 1 comprises a display panel 2, a funnel envelope 3, and an electron gun portion 4. The funnel envelope 3 is formed from at least one of thixotropic magnesium, thixotropic magnesium alloys, thixotropic aluminum, thixotropic aluminum alloys, combinations and mixtures thereof, each of which provides lower weight for the funnel envelope compared to glass funnel envelopes. For example, the weight of a thixotropic magnesium funnel envelope, which has an equivalent stiffness of a glass funnel envelope, is about 5.7 kilograms (kg) (about 12.5 pounds) for a 27-inch display and the weight of a thixotropic aluminum funnel envelope is about 7.3 kg (about 16 pounds) for a 27-inch display, compared to a glass funnel envelope that weighs about 8.2 kilograms (18 pounds). Accordingly, funnel envelopes for cathode ray tubes formed of either thixotropic magnesium or thixotropic aluminum are lighter than glass funnel envelops.

A pressed-formed cathode ray tube funnel envelope that is formed of thixotropic materials may have an increased length, compared to spun glass funnel envelopes. The increased length is due, at least in part, to press-formation process and press-formation apparatus limitations that influence a funnel envelope's wall thickness.

Conventional glass funnel envelopes for cathode ray tube applications have been previously spun to form a funnel envelope shape. The spin process is acceptable for small cathode ray tubes, such as those with sizes less than 21-inch diagonal displays. The displays of cathode ray tubes are now being formed with sizes greater than 21-inch diagonal, for example with a size of 27-inch diagonal or more. Glass funnel envelopes for such sized cathode ray tubes cannot be readily spun, and have been pressed-formed. The press formation of glass cathode ray tube funnel envelopes increases the formation difficulty and increases the overall weight of the funnel envelope. The press formation limits the width of a funnel envelope's deflection angle, and in influences that length of the cathode ray tube.

The cathode ray tubes with the funnel envelope formed from thixotropic materials, as embodied by the invention, have applications in many areas. The applications include, but are not limited to, displays, monitors, televisions, computer displays (also known as monitors), radar screens, and other such devices. This list of applications is not intended to limit the invention in any manner, and the scope of the invention includes other applications.

While various embodiments are described herein, it will be appreciated from the specification that various combinations of elements, variations or improvements therein may be made by those skilled in the art, and are within the scope of the invention.

We claim:

1. A cathode ray tube comprising:

a display panel;

an electron gun portion; and a funnel envelope joining the display panel and the electron gun portion, the funnel envelope comprising at least one of a thixotropic metal in elemental form, a thixotropic metallic alloy, and combinations thereof.

2. The cathode ray tube of claim 1, wherein the thixotropic metal is one of thixotropic aluminum, thixotropic magnesium, and combinations thereof, and wherein the thixotropic aluminum and thixotropic magnesium are each in elemental form.

3. The cathode ray tube of claim 1, wherein the thixotropic metallic alloy is one of a thixotropic aluminum alloy, a thixotropic magnesium alloy, and combinations thereof.

4. A television having a cathode ray tube, the cathode ray tube comprising:

a display panel;

an electron gun portion; and a funnel envelope joining the display panel and the electron gun portion, the funnel envelope comprising at least one of a thixotropic metal in elemental form, a thixotropic metallic alloy, and combinations thereof.

5. The television of claim 4, wherein the thixotropic metal is one of thixotropic aluminum, thixotropic magnesium, and combinations thereof, and wherein the thixotropic aluminum and thixotropic magnesium are each in elemental form.

6. The television of claim 4, wherein the thixotropic metallic alloy is one of a thixotropic aluminum alloy, a thixotropic magnesium alloy, and combinations thereof.

7. A display having a cathode ray tube, the cathode ray tube comprising:

a display panel;

an electron gun portion; and a funnel envelope joining the display panel and the electron gun portion, the funnel envelope comprising at least one of a thixotropic metal in elemental form, a thixotropic metallic alloy, and combinations thereof.

8. The display of claim 7, wherein the thixotropic metal is one of thixotropic aluminum, thixotropic magnesium, and combinations thereof, and wherein the thixotropic aluminum and thixotropic magnesium are each in elemental form.

9. The display of claim 7, wherein the thixotropic metallic alloy is one of a thixotropic aluminum alloy, a thixotropic magnesium alloy, and combinations thereof.

10. A computer monitor having a cathode ray tube, the cathode ray tube comprising:

a display panel;

an electron gun portion; and a funnel envelope joining the display panel and the electron gun portion, the funnel envelope comprising at least one of a thixotropic metal in elemental form, a thixotropic metallic alloy, and combinations thereof.

11. The computer of claim 10, wherein the thixotropic metal is one of thixotropic aluminum, thixotropic magnesium, and combinations thereof, and wherein the thixotropic aluminum and thixotropic magnesium are each in elemental form.

12. The computer of claim 10, wherein the thixotropic metallic alloy is one of a thixotropic aluminum alloy, a thixotropic magnesium alloy, and combinations thereof.

13. A funnel envelope for a cathode ray tube, the funnel envelope comprising at least one of a thixotropic metal in elemental form, a thixotropic metallic alloy, and combinations thereof.

14. The funnel envelope of claim 13, wherein the thixotropic metal is one of thixotropic aluminum, thixotropic magnesium, and combinations thereof, and wherein the thixotropic aluminum and thixotropic magnesium are each in elemental form.

15. The funnel envelope of claim 13, wherein the thixotropic metallic alloy is one of a thixotropic aluminum alloy, a thixotropic magnesium alloy, and combinations thereof.

* * * * *